Oct. 31, 1933.  W. F. VAN LOENEN  1,932,715
ELECTRICAL DEHYDRATOR
Filed Jan. 7, 1931   2 Sheets-Sheet 1

INVENTOR:
WILLIAM F. VAN LOENEN
By
Floyd W. Harris
ATTORNEY.

Oct. 31, 1933.  W. F. VAN LOENEN  1,932,715
ELECTRICAL DEHYDRATOR
Filed Jan. 7, 1931  2 Sheets-Sheet 2
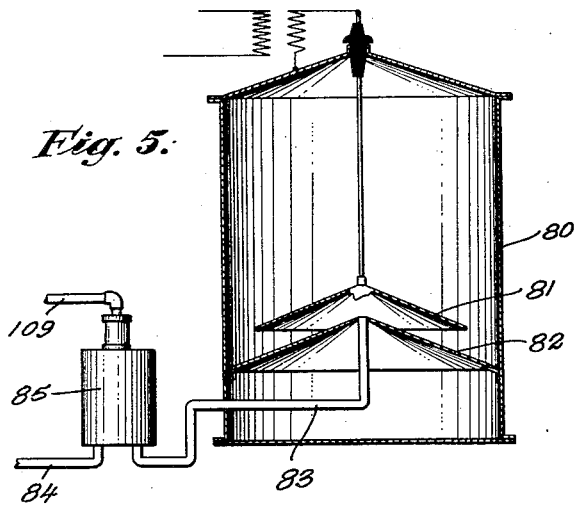
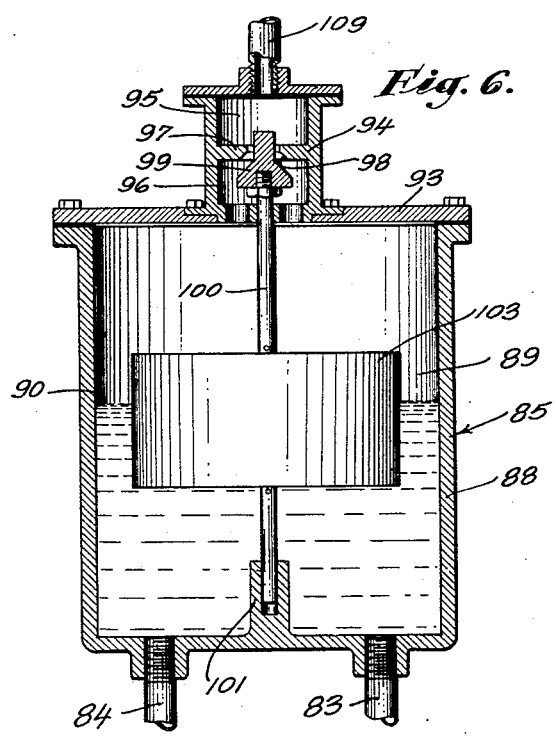
INVENTOR:
WILLIAM F. VAN LOENEN
By
Floyd H. Harris
ATTORNEY.

Patented Oct. 31, 1933

1,932,715

UNITED STATES PATENT OFFICE 1,932,715

ELECTRICAL DEHYDRATOR

William F. Van Loenen, Casper, Wyo., assignor to Petroleum Rectifying Company of California, Los Angeles, Calif., a corporation Application January 7, 1931. Serial No. 507,191

7 Claims. (Cl. 204—24)

My invention relates to a method and apparatus for breaking emulsions, and also to a gas-excluding device which may be attached to conventional dehydrators for improving the operating characteristics thereof.

Petroleum as it comes from the well is often associated with water to form an emulsion which is not marketable until the water content thereof is reduced below pipe-line requirements. One method of thus dehydrating emulsion is to subject it to the action of a high-intensity electric field which has an agglomerating action on the water particles, causing them to join together and form droplets of large enough size to subsequently gravitate from the oil when allowed to settle.

It is often found that such petroleum emulsions have associated therewith a certain amount of entrained gas, and occasionally air is inadvertently pumped to the treater due to a leak in the suction line or to the fact that there is insufficient fluid in the supply tank to furnish the proper amount of fluid to the pump so that a mixture of oil and air is supplied to the treater. The amount of this gas is increased when the emulsion is heated prior to electrical treatment. Heretofore this gas has been considered unobjectionable, but my experiments indicate that the presence of this gas is quite undesirable from numerous standpoints. In the first place, this gas is often in the form of air, and in present-day dehydrators operated under pressure it is very desirable to prevent any accumulation of air in the treater tank, the presence of such air being very dangerous in view of the fact that oil particles and gas mix with this air to form a vapor which is highly explosive. In addition, the presence of gas in the emulsion changes the electrical resistance thereof, and an excess of gas prevents a rapid settling of water particles after treatment, due to the agitation caused by the release of the gas after electric treatment. Even more important, however, is the fact that excluding gas from the emulsion flowing into a given dehydrator often results in a much cleaner separation, the amount of water remaining in the oil being greatly decreased.

It is a primary object of this invention to provide a method and apparatus for excluding gas from an emulsion prior to electric tretament.

Other objects of the invention lie in the particular placement of a valve structure for removing such entrained gases.

A further object of the invention is to provide a novel type of gas-excluding valve.

Other objects and advantages will be made evident hereinafter.

Referring to the drawings,—

Fig. 5 is a view of an electric treater having a gas-removing valve on the exterior thereof.

Fig. 6 is a sectional view of the gas-excluding valve illustrated in Fig. 5.

Figure 1:
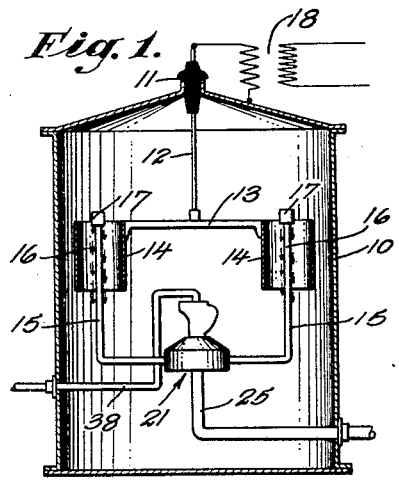
Fig. 1 illustrates a dehydrator with one form of gas-excluding valve.

The gas-excluding valve is advantageous in practically every type of electrical dehydrator. In Fig. 1 I have illustrated one type of dehydrator without laying claim to the particular electrode structure therein included, which electrode structure is claimed in a co-pending application filed by Harmon F. Fisher on September 16, 1926, Serial No. 135,804, as well as in other co-pending applications. The dehydrator illustrated in Fig. 1 comprises a tank 10 in which an insulator 11 is supported. A rod 12 extends through the insulator, and is connected to a yoke 13 which retains a pair of cylindrical electrodes, each being indicated by the numeral 14. These cylindrical electrodes have vertical axes and surround pipes 15 which extend therethrough and form grounded electrodes 16 of relatively small diameter. The upper ends of these pipes carry nozzles 17 which direct the emulsion flowing therethrough downward between the electrodes 14 and 16, whereby the electric treatment is effected when a high voltage is impressed across the electrodes as by a transformer 18. In this and in other forms of the invention to be hereinafter described, any conventional draw-off means, not shown, may be utilized for removing the constituents from the tank, such, for instance, as one or more draw-off pipes.

The pipes 15 are supplied with emulsion from a manifold chamber 20 of a gas-excluding valve 21, this chamber being formed by a lower shell 22 of the gas-excluding valve. Emulsion is introduced into the chamber 20 through a pipe 25 extending to the exterior of the tank.

Figure 2:
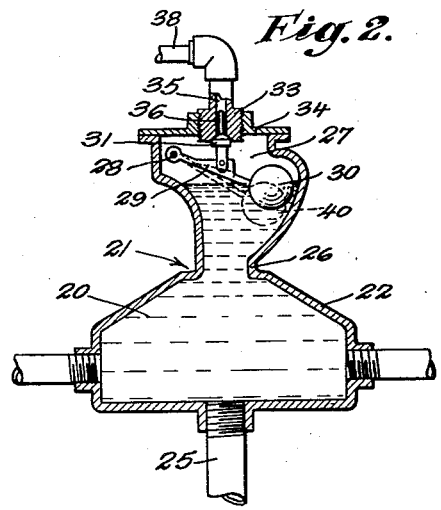
Fig. 2 is a section of the gas-excluding valve shown in Fig. 1.

Any gas associated with this incoming emulsion moves upward in the chamber 20 indicated in Fig. 2, through a neck 26 and into a gas-receiving chamber 27. Pivoted in this latter chamber on a pin 28 is an arm 29, the free end of which carries a float 30. A valve member 31 is in turn pivoted to the arm 29 and adapted to engage a corresponding valve surface on a seat member 33 threaded into a cap 34 closing the gas chamber 27. This seat member has an opening 35 through which gas can pass when the float 30 is lowered, the valve member 31 having a pin 36 thereon extending into the opening 35 to prevent the valve member from dropping from its vertical position shown in Fig. 2. The opening 35 communicates with the pipe 38 opening on the atmosphere around the tank 10.

When the valve member and float 30 are in their full-line positions indicated in Fig. 2, no communication between the opening 35 and the gas-receiving chamber 27 takes place. As more emulsion is forced into the treater, the gas separating therefrom rises into the chamber 27 through the neck 26 and lowers the surface level of the liquid therein until the float 30 assumes its dotted-line position indicated by the numeral 40 of Fig. 2, at which time the valve member 31 is unseated from the seat member 33 and the gas is allowed to escape through the pipe 38. This correspondingly causes the level in the gas-receiving chamber 27 to rise, and when the float again assumes its full-line position the valve member 31 again seats. This operation is automatically repeated during the time that the treater is in operation.

Figure 4:
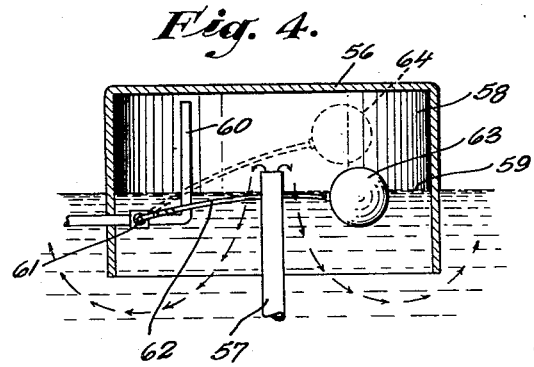
Fig. 4 is a sectional view of the valve shown in Fig. 3.
Figure 3:
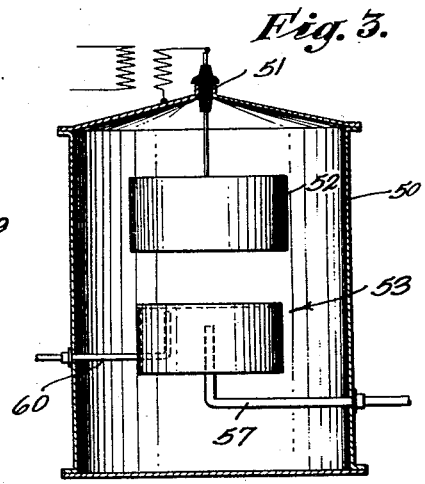
Fig. 3 is an electric treater showing another form of gas-removing valve.

In Fig. 3, I have shown another type of treater having a tank 50, insulator 51, and a cylindrical live electrode 52 suspended from the insulator, the field being formed between the insulator and the tank. A gas-excluding valve 53 is utilized, this valve being positioned in the tank 50 below the electrode 52. The details of this form of gas-excluding valve are best shown in Fig. 4 which illustrates an inverted bell 56 into which the incoming emulsion is supplied through an intake pipe 57. As the emulsion enters the space beneath the bell 56, the gas is freed therefrom and accumulates in the gas chamber 58 formed in the top of this bell so that the position of the liquid level inside the bell is dependent upon the gas in the chamber 58. This liquid level is indicated by the numeral 59 of Fig. 4, and the rise and fall of this level is utilized in automatically discharging gas from the chamber 58 through a pipe 60 extending upward therein and communicating with the exterior of the treater tank 50.

This is accomplished by providing a valve 61 in the pipe 60 which is preferably of the stopcock type, a handle thereof being attached to a rod 62 carrying a ball float 63. When the float is in its full-line position shown in Fig. 4, the valve 61 is open and the level 59 is rising, forcing gas out through the pipe 60. When the ball float reaches its dotted-line position indicated by the numeral 64, the valve 61 is closed, and does not again open until sufficient gas accumulates in the chamber 58 to lower the level 59 sufficiently so that the float 63 again opens the valve.

In Fig. 5, still another type of treater is shown providing a tank 80 in which electrodes 81 and 82 are positioned to define a treating space. The emulsion is forced into this treating space through a pipe 83 extending to the outside of the tank 80 and communicating with a gas-removing valve 85, the details of which are best shown in Fig. 6.

Referring particularly to Fig. 6, this gas-removing valve 85 comprises a shell 88 defining a chamber 89, the pipe 83 communicating with the lower end of this chamber, as does also an intake pipe 84 which supplies emulsion to the lower portion of the chamber. The gas is released from the emulsion in the chamber 89 and moves upward to the upper end thereof, thus forcing the liquid downward and forming a liquid surface 90.

Extending across the upper end of the shell 88 is a cover 93 suitably secured thereto and mounting a valve structure 94 providing upper and lower chambers 95 and 96 separated by a web 97. This web is provided with a central opening which is countersunk to provide a valve surface 98 corresponding in shape to the surface of a valve member 99 which is in turn secured to a rod 100 journalled in a skirt 101 in the bottom of the shell 88. A float 103 is secured to this rod and moves the valve member 99 as a function of the position of the surface 90, the gas being allowed to escape when this surface drops sufficiently to lower the float into its position shown in Fig. 6. Conversely, as the gas escapes the liquid surface 90 rises, thus again closing the valve. A pipe 109 communicates with the upper chamber 95 and carries away the gases thus liberated from the emulsion.

The invention is particularly advantageous in view of the cleaner cuts obtained and the elimination of any possibility of forming a conducting vapor in the upper portion of the treater tank where it might be accidentally ignited by an electric spark. The latter consideration is especially important as a safety means, for it is very desirable that all air be excluded from the interior of the treater. In actual use, the addition of such a gas-removing valve reduced the water content in a typical installation to 0.4%, while the same treater operating without the gas-removing valve gave a final cut of over 1%.

In addition, a smoother flow of emulsion takes place when nozzles are used for injecting this emulsion into the electric field; thus, in the form shown in Fig. 1, the emulsion flows downward around the central electrode 16 in a smooth flow, and no gas particles are liberated during this downward flow which would tend to agitate the emulsion undergoing treatment and cause the downward flow of the emulsion thus impeded. Incidentally, the removal of the gas also affects the dielectric properties of the emulsion, and permits slightly more intense fields to be utilized, thus increasing the possible rate of flow of the emulsion to the treater.

My invention thus broadly comprehends the use of a gas-excluding valve or other means for removing entrained gas particles from an emulsion which is to undergo electrical treatment, and while I have shown several forms of devices capable of thus removing these gases, it should be clear that I am not limited thereto, other methods of removing gases being known in the art.

I claim as my invention:

1. In a dehydrating system, the combination of: a treater tank; electrode means in said tank and defining a treating space supply means for supplying emulsion to said treating space; walls defining a chamber, the lower end of which communicates with said supply means; means for supplying emulsion to said chamber whereby gas is liberated therefrom and moves to the top of said chamber to force the surface level of said emulsion downward therein; and means controlled as a function of the position of said surface level for releasing gas from the upper end of said chamber.

2. In an electric dehydrating system, the combination of: a treater tank; means for establishing a high intensity electric field in said treater tank; a gas-removing valve positioned in said tank; and means for forcing emulsion through said gas-removing valve and subsequently into said electric field.

3. A combination as defined in claim 2 including means for venting said gas-removing valve to the exterior of said treating tank.

4. A combination as defined in claim 2 including venting means comprising a pipe opening onto the atmosphere surrounding said treating tank and communicating with said gas-removing valve.

5. In an electric treater the combination of: a tank; electrode means in said tank; walls defining a chamber closed at its upper end; means for introducing emulsion into said chamber whereby any gas entrained therein moves into the upper portion of said chamber; valve means in the upper portion of said chamber and vented to a point outside said tank; means controlling said valve means to periodically remove gas from the upper end of said chamber; and means communicating with said chamber at a point below the gas therein and conducting to said electrode means the emulsion from which said gas has been removed.

6. In an electric dehydrating system for emulsions, the combination of: a tank; electrode means in said tank and defining a treating space; pipe means communicating with said treating space for supplying emulsion thereto; a gas-removing means associated with said pipe means and discharging thereinto; means for delivering emulsion to said gas-removing means, said means removing gas therefrom so that the emulsion flowing through said pipe means is freed of gas; means for removing the gas from the vicinity of said gas-removing means; and means for establishing an electric field in said treating space.

7. In an electric dehydrating system for emulsions, the combination of: a treater tank; means for establishing a high intensity electric field in said treater tank; a gas-removing valve; and means for forcing the entire stream of emulsion to be treated through said gas-removing valve and subsequently into said electric field.

WILLIAM F. VAN LOENEN.